(12) United States Patent
Luo et al.

(10) Patent No.: US 11,254,172 B2
(45) Date of Patent: Feb. 22, 2022

(54) TIRE PRESSURE SENSOR WITH ELASTIC TELESCOPIC VALVE ASSEMBLY

(71) Applicant: AUTEL INTELLIGENT TECHNOLOGY CORP., LTD., Guangdong (CN)

(72) Inventors: Yongliang Luo, Guangdong (CN); Yingjun Liu, Guangdong (CN)

(73) Assignee: AUTEL INTELLIGENT TECHNOLOGY CORP., LTD., Shenzhen (CN)

( * ) Notice: Subject to any disclaimer, the term of this patent is extended or adjusted under 35 U.S.C. 154(b) by 27 days.

(21) Appl. No.: 16/913,614

(22) Filed: Jun. 26, 2020

(65) Prior Publication Data

US 2020/0324587 A1 Oct. 15, 2020

Related U.S. Application Data

(63) Continuation of application No. PCT/CN2019/128645, filed on Dec. 26, 2019.

(30) Foreign Application Priority Data

Dec. 26, 2018 (CN) .......................... 201811601018.1

(51) Int. Cl.
*B60C 23/04* (2006.01)
*B60C 29/02* (2006.01)

(52) U.S. Cl.
CPC .............. *B60C 23/04* (2013.01); *B60C 29/02* (2013.01)

(58) Field of Classification Search
CPC ............ B60C 23/0408; B60C 23/0496; B60C 23/061; B60C 23/0494; B60C 23/0416;
(Continued)

(56) References Cited

U.S. PATENT DOCUMENTS

2008/0121031 A1  5/2008  Huang
2020/0324589 A1* 10/2020  Luo ..................... B60C 23/0408

FOREIGN PATENT DOCUMENTS

CN  204249746 U  4/2015
CN  104626892 A  5/2015
(Continued)

OTHER PUBLICATIONS

International Search Report dated Mar. 26, 2020; PCT/CN2019/128645.
(Continued)

*Primary Examiner* — Andre J Allen

(57) ABSTRACT

The invention relates to the field of tire pressure detection technologies, and discloses a tire pressure sensor including: a valve assembly including a mounting portion and an elastic telescopic structure mounted to the mounting portion, the elastic telescopic structure elastically extending and retracting on at least one side of the mounting portion; a sensor assembly having two opposite clamping surfaces, at least one of the two clamping surfaces being provided with a locking hole, the mounting portion being located between two of the clamping surfaces, and the elastic telescopic structure being inserted into the locking hole. After the elastic telescopic structure is shortened, the mounting portion of the valve assembly may be inserted between the two clamping surfaces. When the mounting portion of the valve assembly is located between the two clamping surfaces, the elastic telescopic structure may be extended and inserted into the locking hole automatically, so that the valve assembly and the sensor assembly may be installed conveniently, and no additional tools are required.

20 Claims, 10 Drawing Sheets

(58) Field of Classification Search
CPC . B60C 23/0433; B60C 23/0493; B60C 19/00; B60C 23/04; B60C 23/041; B60C 23/0411; B60C 23/20; B60C 23/0444; B60C 23/0462; B60C 11/24; B60C 23/064; B60C 23/007; B60C 23/0479; B60C 23/062; B60C 23/0401; B60C 23/0413; B60C 23/0488; B60C 23/043; B60C 23/06; B60C 23/0452; B60C 23/0467; B60C 11/246; B60C 23/0498; B60C 23/02; B60C 99/006; B60C 23/0428; B60C 23/0442; B60C 23/009; B60C 23/0425; B60C 2019/004; B60C 23/004; B60C 11/243; B60C 23/00354; B60C 23/045; B60C 23/0464; B60C 23/003; B60C 23/00318; B60C 23/0472; B60C 23/066; B60C 23/00372; B60C 23/0403; B60C 23/0406; B60C 29/02; B60C 11/00; B60C 23/006; B60C 23/044; B60C 23/00; B60C 23/0455; B60C 23/008; B60C 23/0454; B60C 23/0461; B60C 23/0415; B60C 23/0474; B60C 23/0489; B60C 23/0491; B60C 25/002; B60C 29/064; B60C 23/00363; B60C 23/0483; B60C 11/0318; B60C 23/0459; B60C 23/0471; B60C 23/0481; B60C 23/042; B60C 2019/005; B60C 23/002; B60C 23/0422; B60C 23/0423; B60C 23/0466; B60C 2200/02; B60C 23/0405; B60C 23/0477; B60C 29/06; B60C 13/001; B60C 23/0476; B60C 25/132; B60C 23/0437; B60C 23/0447; B60C 23/0427; B60C 23/0449; B60C 25/00; B60C 9/18; B60C 13/00; B60C 19/003; B60C 23/065; B60C 23/00336; B60C 23/0484; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0418; B60C 23/0457; B60C 23/12; B60C 25/18; B60C 11/13; B60C 23/0469; B60C 23/04985; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/127; B60C 23/16; B60C 29/068; B60C 3/04; B60C 9/20; B60C 11/01; B60C 11/0302; B60C 13/02; B60C 23/126; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 23/131; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22; G01M 17/02; G01M 17/022; G01M 17/027; G01M 17/021; G01M 17/024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06

USPC .............................................. 73/146–146.8

See application file for complete search history.

(56) References Cited

FOREIGN PATENT DOCUMENTS

| | | | |
|---|---|---|---|
| CN | 206383757 | U | 8/2017 |
| CN | 207106064 | U | 3/2018 |
| CN | 109435593 | A | 3/2019 |
| JP | 2013244747 | A | 12/2013 |
| JP | 2013244757 | A | 12/2013 |
| JP | 2015058776 | A | 3/2015 |
| WO | 2015/172351 | A1 | 11/2015 |

(56) References Cited

OTHER PUBLICATIONS

European Search Report dated Nov. 27, 2020; Appln. No. 19874767.7.

* cited by examiner

TIRE PRESSURE SENSOR WITH ELASTIC TELESCOPIC VALVE ASSEMBLY

This application is a continuation application of International Application No. PCT/CN2019/128645, filed on Dec. 26, 2019, which claims priority of Chinese Patent Application No. 201811601018.1, filed on Dec. 26, 2018, which is incorporated herein by reference in its entirety.

BACKGROUND

Technical Field

The present application relates to the field of tire pressure detection technologies, and in particular, to a tire pressure sensor.

Related Art

A pressure-sensor based tire pressure monitoring system is also referred to as a PSB TPMS. The PSB TPMS uses a tire pressure sensor installed on a tire to measure barometric pressure and temperature of the tire, uses a wireless transmitter to send pressure information from a tire interior to a tire pressure detection terminal, and displays barometric pressure data of the tire. When the tire is at high pressure, low pressure and high temperature, the system will alert the vehicle owner. In addition, the owner may set a tire pressure alarm value range and a temperature alarm value according to a vehicle type, car using habits and geographical location.

A traditional tire pressure sensor includes a sensor and a valve mounted to the sensor. The sensor is configured to detect tire information inside the tire, the valve is configured to inflate and deflate the tire, and the valve and the sensor are generally connected through a threaded fastener.

However, in the process of implementing the present invention, the inventor finds that in the current tire pressure sensor, the valve and the sensor are connected through the threaded fastener, the process of installing the valve and the sensor is relatively difficult with long installation time, and needs an extra torque wrench with high costs. Therefore, the prior art needs to be improved.

SUMMARY

In order to solve the foregoing technical problem, an embodiment of the present invention provides a tire pressure sensor. A valve assembly and a sensor assembly of the tire pressure sensor are easy to install and do not require additional tools.

In order to resolve the foregoing technical problem, the embodiments of the present invention provide the following technical solutions.

A tire pressure sensor is provided, including: a valve assembly including a mounting portion, a rod portion, a rod sleeve and an elastic telescopic structure, the mounting portion being connected to the rod portion, and the rod sleeve being sleeved on the rod portion, the elastic telescopic structure being mounted to the mounting portion, and the elastic telescopic structure elastically extending and retracting on at least one side of the mounting portion; a sensor assembly having two opposite clamping surfaces, at least one of the two clamping surfaces being provided with a locking hole, the mounting portion being located between two of the clamping surfaces, and the elastic telescopic structure being inserted into the locking hole, where there are at least two sets of valve assemblies, any of the at least two sets of the valve assemblies being alternatively connected to the sensor assembly, a rod sleeve of one of the at least two sets of the valve assemblies being made of a metal material, and a rod sleeve of the other of the at least two sets of the valve assemblies being made of a rubber material.

In some embodiments, the mounting portion is in contact with two of the clamping surfaces, respectively.

In some embodiments, the valve assembly includes a valve rod, the valve rod including the mounting portion and the rod portion. The elastic telescopic structure may extend and retract in a radial direction of the valve rod, and the clamping surface is parallel to an axial direction of the valve rod.

In some embodiments, the sensor assembly has a first surface, the first surface being provided with a groove, and the groove having two of the clamping surfaces; and the mounting portion being inserted into the groove.

In some embodiments, at least one of the clamping surfaces provided with the locking hole is provided with a guide groove, the guide groove being disposed between the locking hole and the first surface along the axial direction.

In some embodiments, along the axial direction and toward the locking hole from the first surface, a depth of the guide groove gradually decreases.

In some embodiments, the mounting portion is provided with a mounting hole disposed along the radial direction, and the elastic telescopic structure is mounted to the mounting hole.

In some embodiments, the elastic telescopic structure includes a pin and a first elastic member; the pin being sleeved in the mounting hole and retracting into and extending out of the mounting hole in the radial direction; and the first elastic member being configured to provide a first elastic force causing the pin to extend out of the mounting hole.

In some embodiments, the two clamping surfaces are provided with the locking holes, the mounting holes are provided with two openings on the mounting portion, and there are two pins; each of the pins extending out or retracting into the mounting hole from a corresponding opening of the mounting hole in the radial direction.

In some embodiments, the first elastic member abuts between two of the pins.

In some embodiment, the first elastic member is a first compression spring.

In some embodiment, the elastic telescopic structure further includes a bushing mounted to the mounting hole; the bushing having an inner cavity disposed along the radial direction, and the pin being sleeved in the inner cavity.

In some embodiments, the valve rod further includes a vent portion and a mouth portion, the mounting portion, the vent portion, the rod portion and the mouth portion being sequentially arranged along the axial direction; the valve rod is provided with a first vent hole and a second vent hole that are in communication with each other, an opening of the first vent hole being provided at the mouth portion, and an opening of the second vent hole being provided at the vent portion; and the second vent hole being located outside the groove.

In some embodiments, the second vent hole is disposed along the radial direction.

In some embodiments, the valve assembly further includes a valve cover, the valve cover being connected to the mouth portion through threads.

In some embodiments, the rod sleeve made of metal includes a seal ring, a gasket, and a nut, the seal ring, the gasket, and the nut being sequentially sleeved on the rod portion, the nut and the rod portion being connected through threads, the gasket being clamped between the nut and the seal ring, and the seal ring being clamped between the vent portion and the gasket.

In some embodiments, the tire pressure sensor further includes a metal rod member, the metal rod member being configured to pass through the second vent hole.

In some embodiments, the sensor assembly includes a base and a bracket connected to the base, the base being configured to fit a rim, a transmitting plate being disposed in the base, and the bracket having a first surface.

In some embodiments, the base includes an upper case and a case bottom, the upper case and the bracket being connected, the case bottom being configured to fit a rim, the upper case and the case bottom being connected through laser welding, and the upper case and the case bottom being connected to form a cavity for receiving the transmitting plate.

In some embodiments, the bracket includes a bracket body and a locking structure connected to the bracket body, the bracket body being connected to the base, the bracket body having the first surface, two of the clamping surfaces being provided with a mounting opening, and the locking structure including locking pieces, two of the locking pieces being provided with the locking holes, each of the locking pieces being opposite to a corresponding mounting opening, and each of the locking holes being exposed to a corresponding one mounting opening.

In some embodiments, the bracket body further has a second surface, the second surface being provided with a pressing groove, the pressing groove being located between the second surface and the groove, a bottom of the pressing groove being provided with slots, two of the slots being located on both sides of the groove, and each of the locking pieces being located in a corresponding one of the slots. The locking structure further includes a connecting piece, the connecting piece being connected between the two locking pieces, and the connecting piece being in contact with the bottom of the pressing groove.

In some embodiments, the sensor assembly further includes a pressing member and a second elastic member. The pressing member includes a moving plate and a pressing plate, the pressing plate being connected between two of the moving plates, each of the moving plates being located in a corresponding one of the slots, and each of the moving plates abutting against a corresponding side that is of the locking piece and that faces away from the groove. The pressing plate is opposite to the connecting piece, and when the pressing plate moves toward a direction close to the connecting piece, each of the moving plates moves along a corresponding one of the locking pieces, so that each of the moving plates may extrude a corresponding one of the elastic telescopic structures from the locking hole. The second elastic member is configured to provide a second elastic force for moving the pressing plate toward a direction away from the connecting piece.

In some embodiment, the second elastic member is a second compression spring.

In some embodiments, at least one of the two locking pieces is provided with a limiting portion, the limiting portion being located on a side that is of the locking piece and that faces away from the groove. A bent plate is provided between the moving plate and the pressing plate, one end of the bent plate being connected to the moving plate, and the other end of the bent plate being connected to the pressing plate. The bent plate is U-shaped, so that the two ends of the bent plate are opposite, and the limiting portion is located between the two ends of the bent plate. When each of the moving plates moves along a corresponding one of the lock pieces, the bent plate abuts against the limiting portion, so that the locking structure and the pressing member are not relatively separated from each other.

In comparison to the prior art, in the tire pressure sensor of the embodiment of the present invention, after the elastic telescopic structure is shortened, the mounting portion of the valve assembly may be inserted between the two clamping surfaces. When the mounting portion of the valve assembly is located between the two clamping surfaces, the elastic telescopic structure may be extended and inserted into the locking hole automatically, so that the valve assembly and the sensor assembly may be installed conveniently, and no additional tools are required.

BRIEF DESCRIPTION OF THE DRAWINGS

One or more embodiments are described by way of example with reference to the corresponding accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

For ease of understanding this application, this application is described in further detail below with reference to the accompanying drawings and specific implementations. It should be noted that when an element is described as being "fixed" on another element, the element may be directly on the another element, or one or more intermediate elements may exist therebetween. When an element is described as being "connected" to another element, the element may be directly connected to the another element, or one or more intermediate elements may exist therebetween. Terms such as "perpendicular", "horizontal", "left", and "right" and similar expressions used in this specification are merely used for the purpose of description.

Unless otherwise defined, meanings of all technical and scientific terms used in this specification are the same as that usually understood by persons skilled in the technical field to which this application belongs. In this specification, terms used in the specification of the present disclosure are merely intended to describe objectives of the specific embodiments, but are not intended to limit the present disclosure. A term "and/or" used in this specification includes any or all combinations of one or more related listed items.

Figure 1:
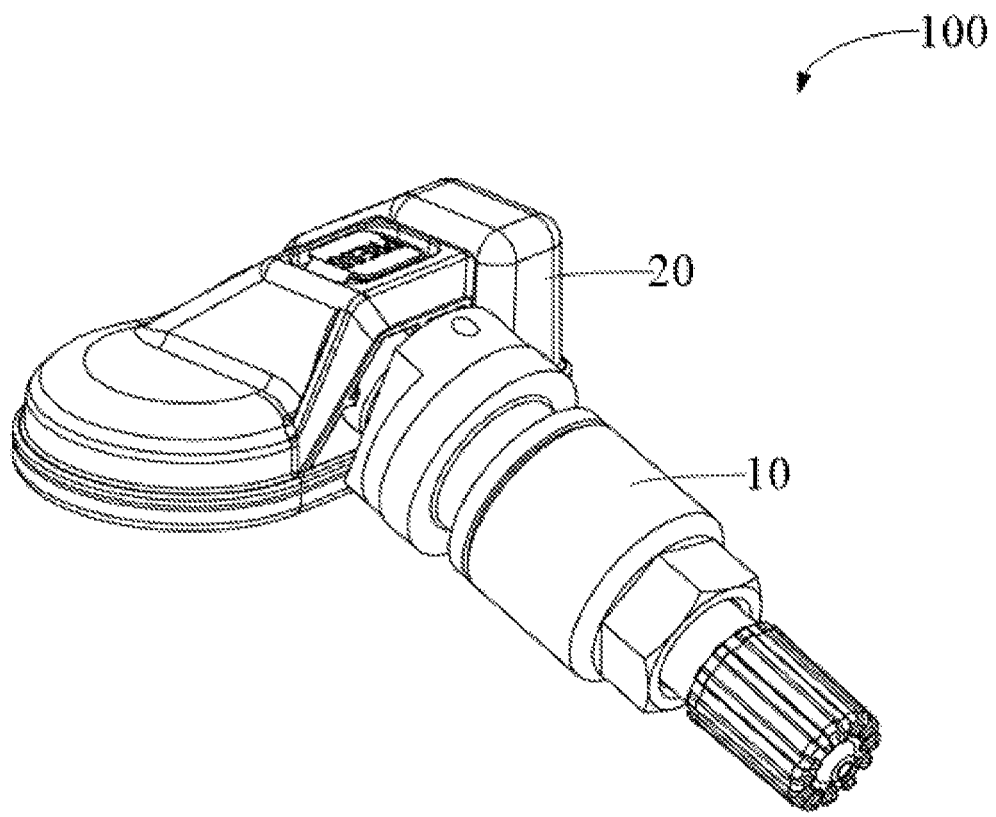
FIG. 1 is a three-dimensional diagram of a tire pressure sensor according to an embodiment of the present invention.
Figure 2:
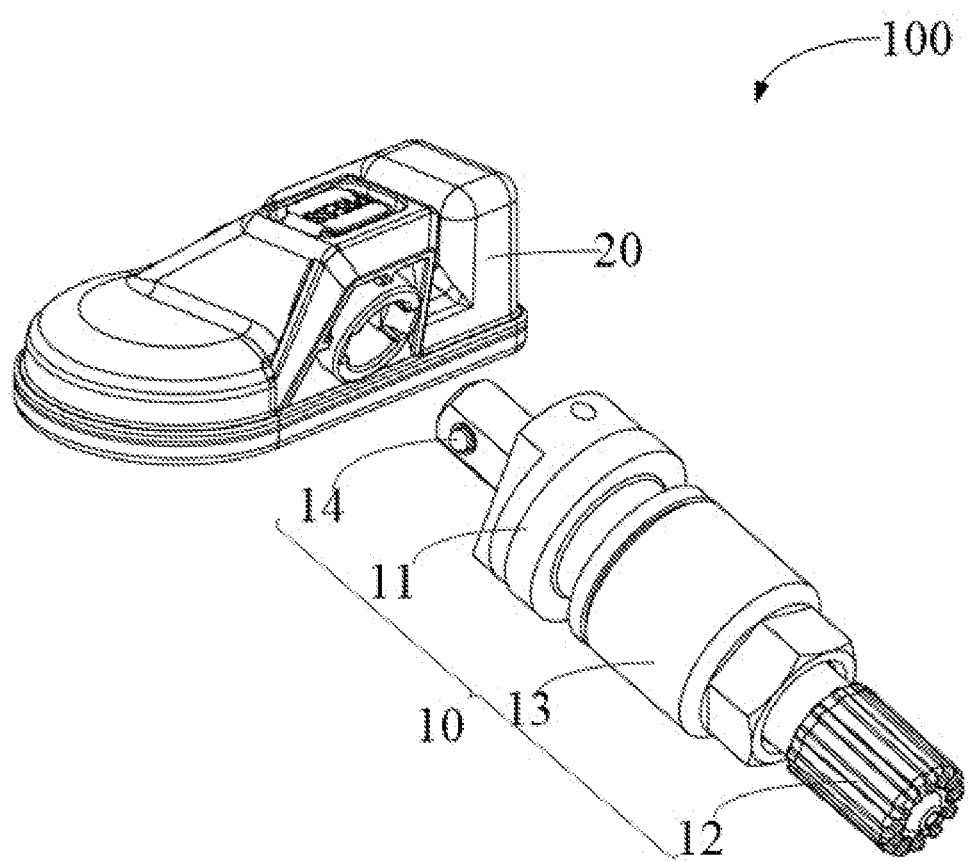
FIG. 2 is an exploded view of the tire pressure sensor shown in FIG. 1.

Referring to FIG. 1 and FIG. 2, a tire pressure sensor 100 provided in an embodiment of the present invention includes a sensor assembly 20 and at least two sets of valve assemblies 10 with different specifications. The at least two sets of valve assemblies 10 with different specifications may be alternately connected to the sensor assembly 20. The at least two sets of valve assemblies 10 with different specifications are disposed, so that a user may mount, according to requirements, valve assemblies that meet the requirements on the sensor assembly 20.

Figure 3:
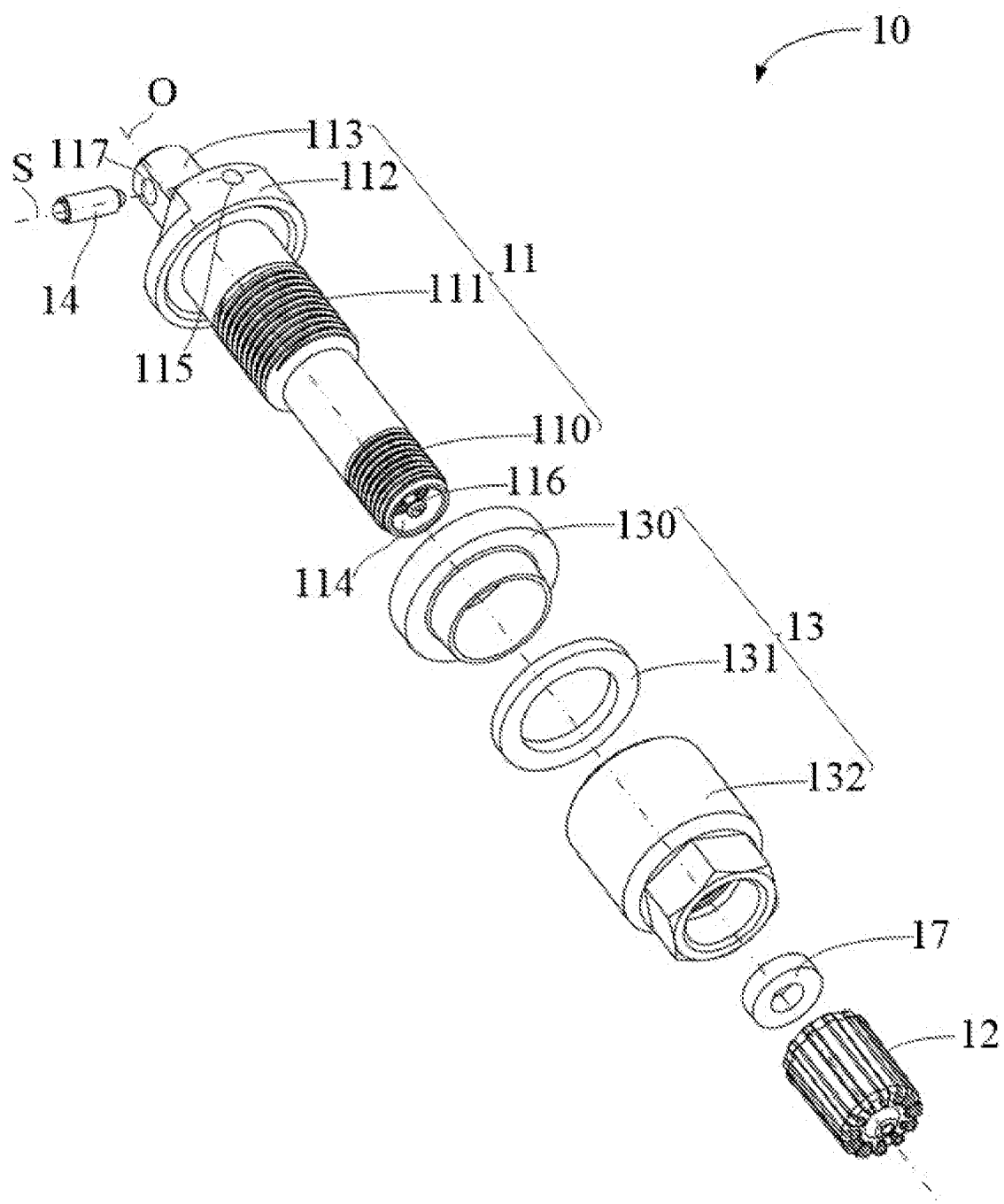
FIG. 3 is an exploded view of a valve assembly of the tire pressure sensor shown in FIG. 2.
Figure 4:
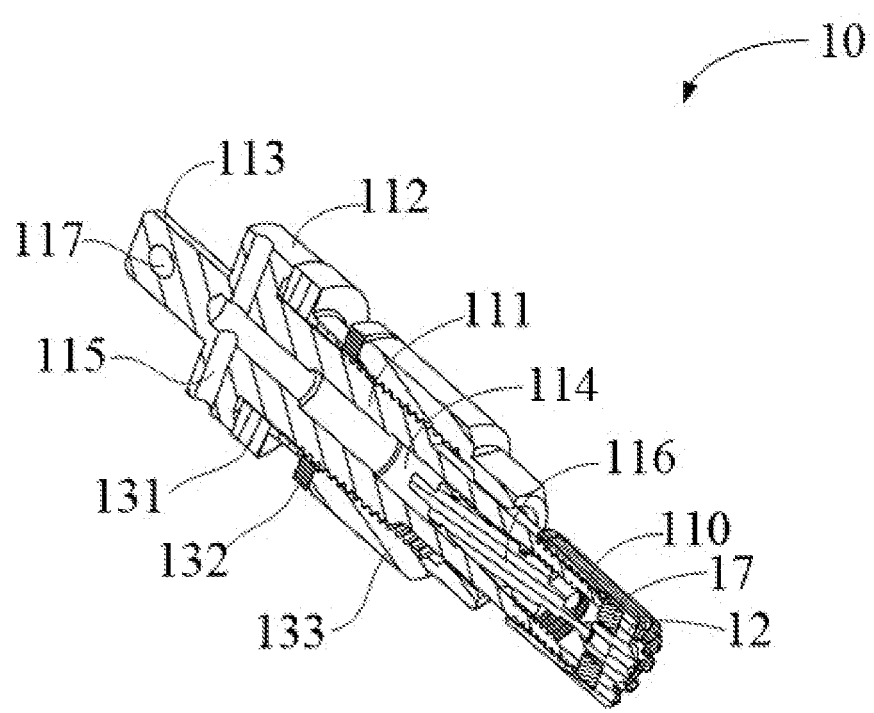
FIG. 4 is a cross-sectional view of a valve assembly shown in FIG. 3.
Figure 5:
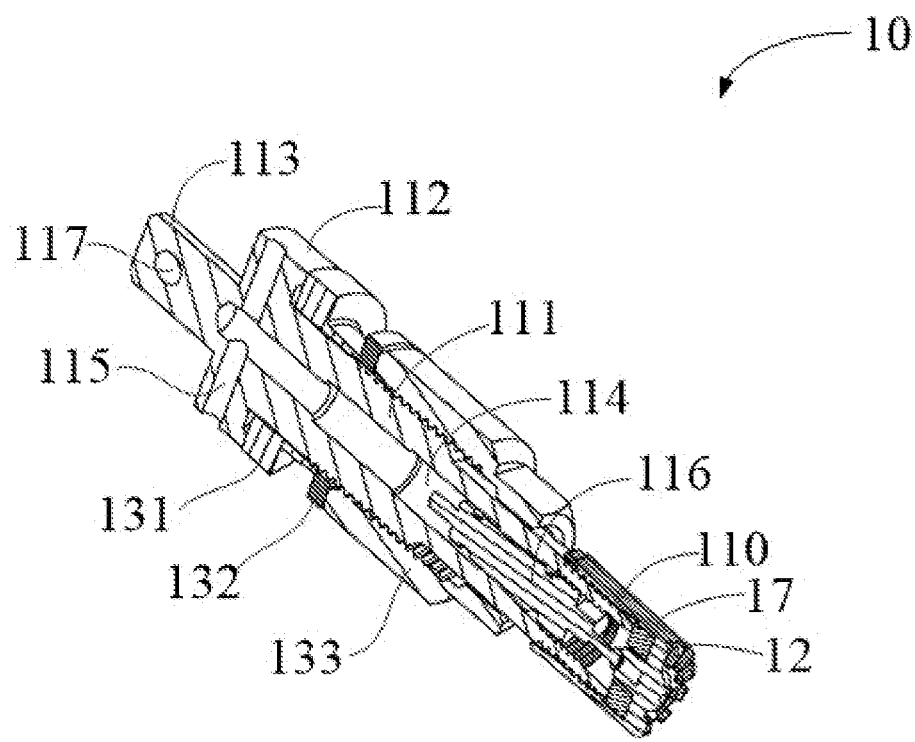
FIG. 5 is an exploded view of another valve assembly of the tire pressure sensor shown in FIG. 2, where some components are omitted.

Referring to FIG. 3 to FIG. 5 together, any of the at least two sets of valve assemblies 10 with different specifications includes a valve rod 11, a valve cover 12, a rod sleeve 13, and an elastic telescopic structure 14. The valve cover 12 is mounted to one end of the valve rod 11, the elastic telescopic structure 14 is mounted to the other end of the valve rod 11, and the rod sleeve 13 is sleeved between two ends of the valve rod 11.

The valve rod 11 may be made of copper or copper alloy. The valve rod 11 includes a mouth portion 110, a rod portion 111, a vent portion 112, and a mounting portion 113 that are arranged and connected along an axial direction O.

The valve rod 11 is provided with a first vent hole 114 and a second vent hole 115 that are in communication with each other. The first vent hole 114 is disposed along the axial direction O, and an opening of the first vent hole 114 is provided in the mouth portion 110. The first vent hole 114 passes through the mouth portion 110 and the rod portion 111 successively, and extends to the vent portion 112, and a valve core 116 is disposed in the first vent hole 114. The second vent hole 115 is provided along a radial direction S of the valve rod 11, the second vent hole 115 penetrates through the vent portion 112, the first vent hole 114 is in communication with the second vent hole 115 in the vent portion 112, and the first vent hole 114 and the second vent hole 115 form a T-shaped hole.

The mouth portion 110 is connected to the valve cover 12 through threads, and the valve cover 12 is configured to close the opening of the first vent hole 114. A nut seal ring 17 is provided between the valve cover 12 and the mouth portion 110, the nut seal ring 17 being configured to improve air tightness between the valve cover 12 and the first vent hole 114.

The rod sleeve 13 is sleeved on the rod portion 111, and a rod sleeve 13 of any of the at least two sets of valve assemblies 10 is different from rod sleeves 13 of the remaining sleeves. A rod sleeve 13 of one of the at least two sets of valve assemblies 10 includes a seal ring 130, a gasket 131, and a nut 132. Both the gasket 131 and the nut 132 may be made of copper or copper alloy, and the seal ring 130 may be made of rubber. The seal ring 130, the gasket 131 and the nut 132 are sleeved on the rod portion 111 in sequence, the seal ring 130 is clamped between the gasket 131 and the vent portion 112, the gasket 131 is clamped between the seal ring 130 and the nut 132, and the nut 132 is connected to the rod portion 111 through threads.

A rod sleeve 13 of the other of the at least two sets of valve assemblies 10 may be made of a rubber material.

The mounting portion 113 is provided with a mounting hole 117 along the radial direction S. The mounting hole 117 penetrates through the mounting portion 113, and is configured to mount the elastic telescopic structure 14.

Figure 6:
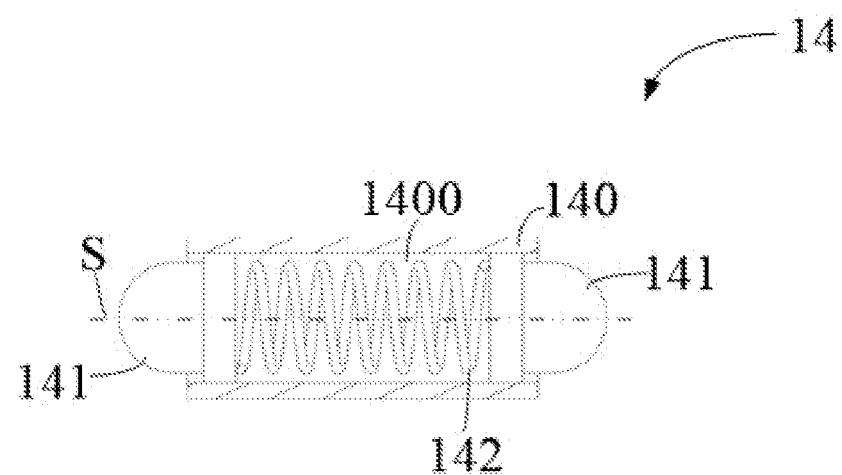
FIG. 6 is a cross-sectional view of an elastic telescopic structure of a valve assembly shown in FIG. 3.

Referring to FIG. 6, the elastic telescopic structure 14 may be elastically extended and retracted relative to the mounting portion 113 in the radial direction S. The elastic telescopic structure 14 includes a bushing 140, a pin 141, and a first elastic member 142. The bushing 140 has a cylindrical shape as a whole. The bushing 140 is sleeved in the mounting hole 117. The bushing 140 has an inner cavity 1400, the inner cavity 1400 being disposed along the radial direction S. The inner cavity 1400 is provided with two opposite openings on the bushing 140, and the inner cavity 1400 is provided with a reduced diameter at both openings thereof. There are two pins 141, each of the pins 141 being sleeved in the inner cavity 1400, and each of the pins 141 may move along the inner cavity 1400, so that each of the pins 141 may extend or retract into a corresponding opening of the inner cavity 1400. The first elastic member 142 abuts between two of the pins 141. The first elastic member 142 is configured to provide a first elastic force for making the pin 141 extend out of the inner cavity 1400. The first elastic member 142 is a first compression spring. According to actual conditions, the first elastic member 142 may also be an elastic piece, an elastic rubber ball, or the like.

It may be understood that, according to the actual situation, the bushing 140 may be omitted, that is, the pin 141 may be directly sleeved in the mounting hole 117.

Figure 7:
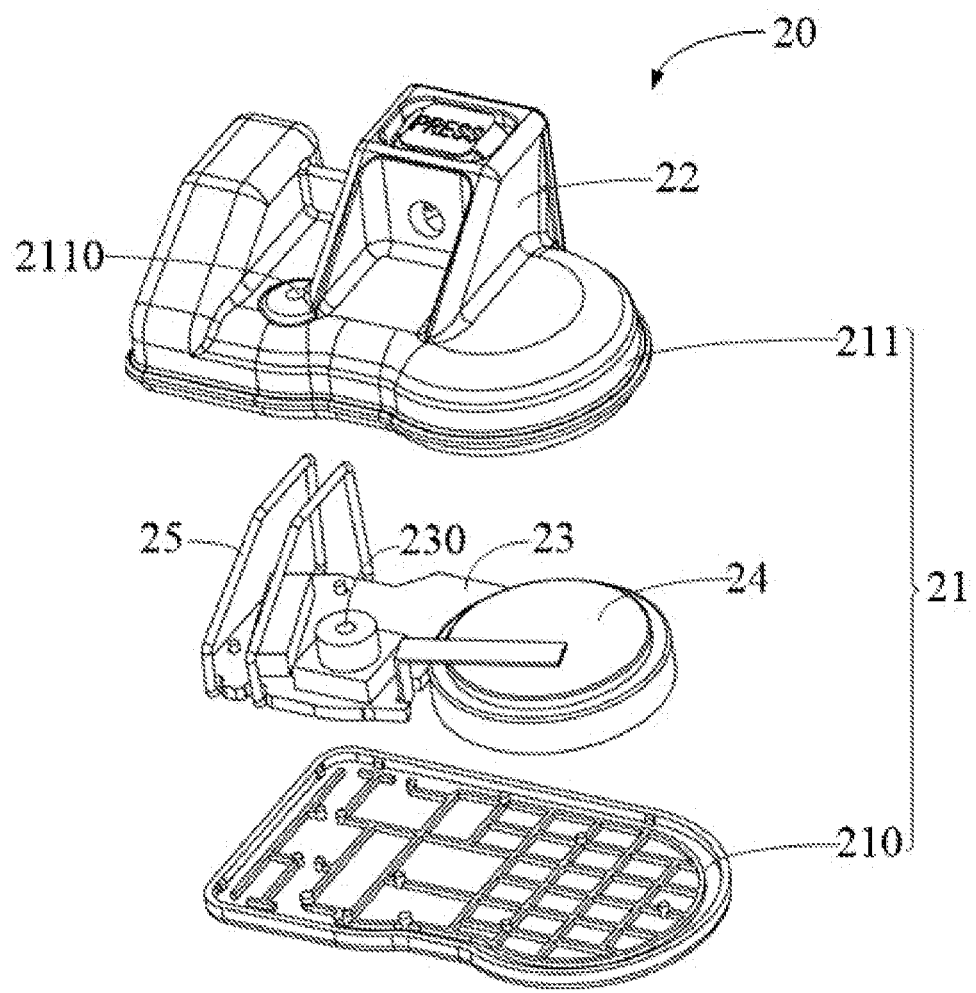
FIG. 7 is an exploded view of a sensor assembly of the tire pressure sensor shown in FIG. 2.

Referring to FIG. 7, the sensor assembly 20 includes a base 21 and a mounting stand 22 connected to the base 21.

The base 21 may be made of a plastic material, and a cavity is provided in the base 21. Components such as a circuit board 23, a battery 24, and an antenna 25 are mounted in the cavity. The circuit board 23 carries various chips, for example, a pressure detection chip, which is provided with an air pressure detection hole 230 and being configured to detect air pressure in the air pressure detection hole 230; and for another example, a wireless transmission chip, which is configured to be wirelessly connected, through the antenna 25, to a tire pressure monitoring terminal located on an automobile dashboard. The battery 24 may be a button battery, which is connected to the circuit board 23 by soldering and is configured to supply power to the circuit board 23. The antenna 25 may be a radio frequency antenna. The antenna 25 is connected to the circuit board 23 by soldering. The antenna 25, the battery 24, and the circuit board 23 form a transmitting plate.

Figure 8:
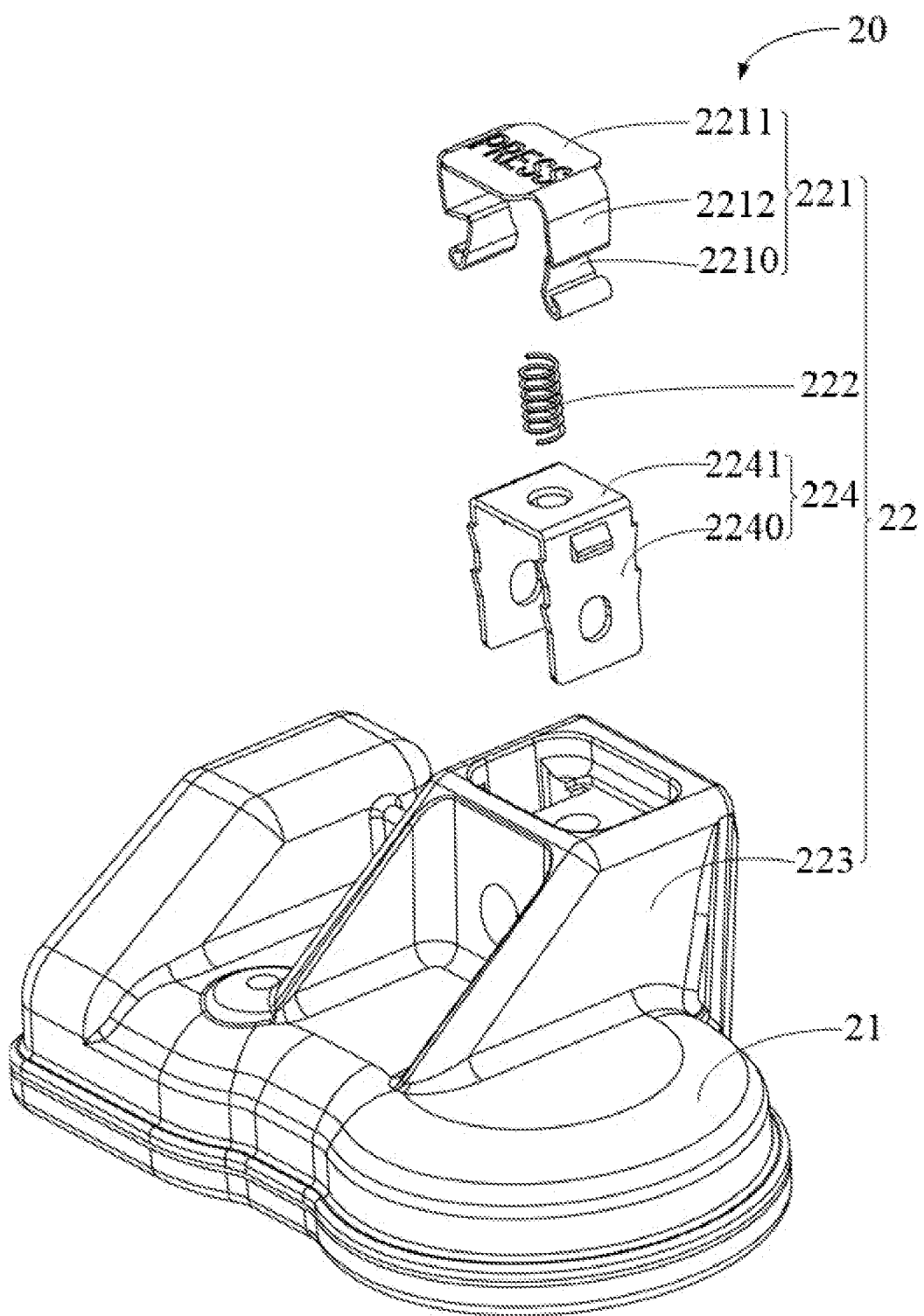
FIG. 8 is another exploded view of the sensor assembly shown in FIG. 7.
Figure 9:
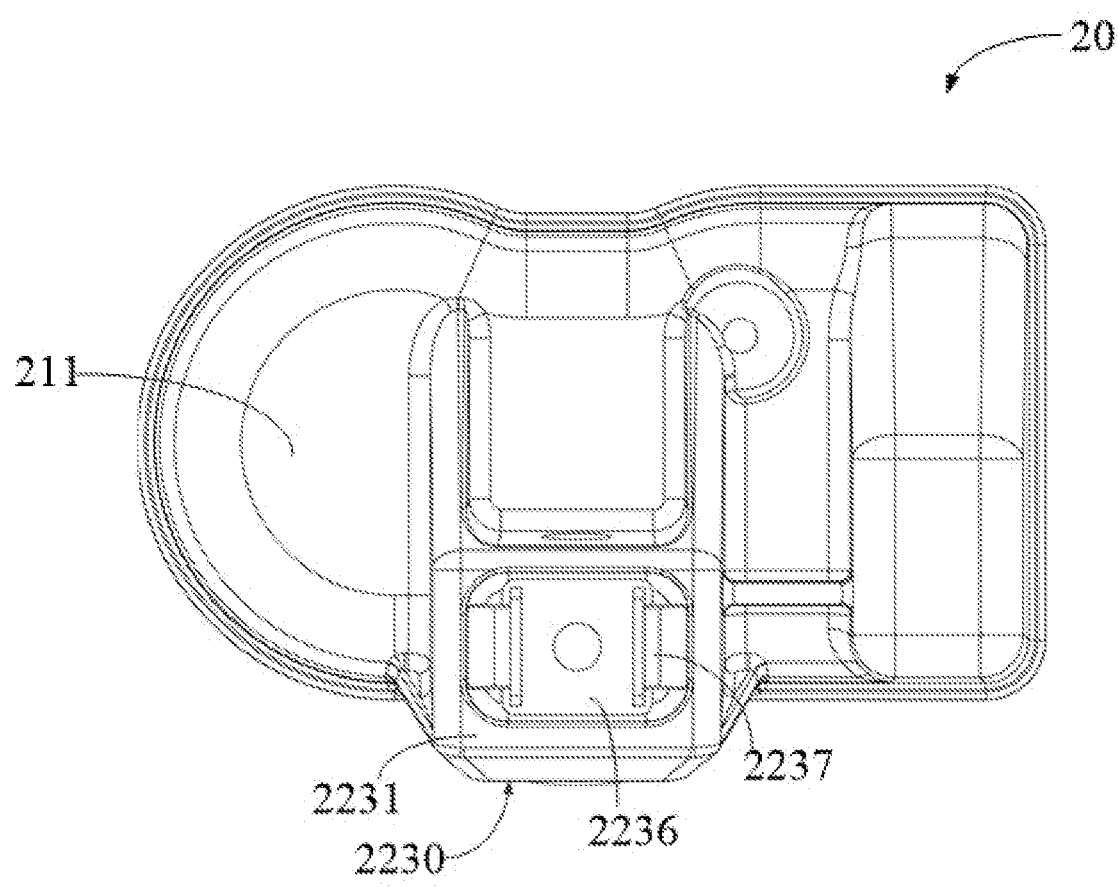
FIG. 9 is a top view of the sensor assembly shown in FIG. 7.
Figure 10:
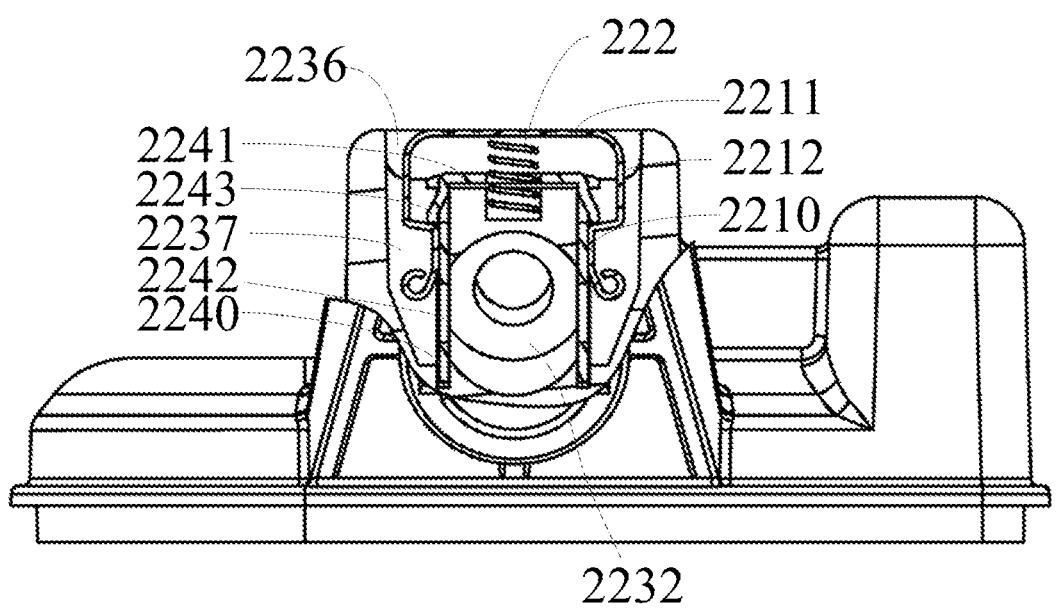
FIG. 10 is a cross-sectional view of a portion of the sensor assembly shown in FIG. 7.

Referring to FIG. 8 to FIG. 10 together, the base 21 includes a case bottom 210 and an upper case 211. The upper case 211 is connected to the case bottom 210 to form the cavity.

The case bottom 210 may be made of a light-transmissive material, and a surface that is of the case bottom 210 and that faces away from the upper case 211 is configured to fit the rim of the tire.

The upper case 211 may be made of a dark opaque material. A surface that is of the upper case 211 and that faces away from the case bottom 210 is provided with an air hole 2110, the air hole 2110 being aligned with the air pressure detection hole 230 of the air pressure detection chip. The air hole 2110 and the air pressure detection hole 230 are sealed using a sealing gasket.

In the present embodiment, the upper case 211 and the case bottom 210 are connected through laser welding.

In some other embodiments, the upper case 211 and the case bottom 210 are connected through potting.

It should be noted that, in comparison to the way that the upper case 211 and the case bottom 210 are connected through potting, the upper case 211 and the case bottom 210 are connected through laser welding, so that the cavity has good gas tightness. In addition, the upper case 211 and the case bottom 210 have high assembly efficiency, and the damage of the colloid to the human body and the pollution to the environment are reduced.

The mounting stand 22 is disposed on a side of the upper case 211 away from the case bottom 210. A maximum distance between the case bottom 210 and the mounting stand 22 does not exceed a preset distance, so that the sensor assembly 20 can fit the rim of the tire better, to prevent the sensor assembly 20 from suspending when being removed from the tire, so that the sensor assembly 20 is not easily damaged.

The mounting stand 22 is configured to mount the valve assembly 10. The mounting stand 22 includes a bracket 220, a pressing member 221, and a second elastic member 222.

The bracket 220 is configured to mount the valve assembly 10, and includes a bracket body 223 and a locking structure 224 mounted to the bracket body 223.

The bracket body 223 is connected to the upper case 211. The bracket body 223 includes a first surface 2230 and a second surface 2231. The first surface 2230 is vertical to the case bottom 210, and the second surface 2231 faces away from the case bottom 210. According to actual conditions, a position of the first surface 2230 and a position of the second surface 2231 may be in any state. For example, the first surface 2230 and the second surface 2231 are opposite, which is not limited in the present embodiment.

The first surface 2230 is provided with a groove 2232. The groove 2232 is provided along the axial direction O. The mounting portion 113 of the valve rod 11 is matched with the groove 2232. The mounting portion 113 of the valve rod 11 may be inserted into the groove 2232 along the axial direction O, and the vent portion 112 is located outside the groove 2232, that is, the second vent hole 115 is located outside the groove 2232.

A groove wall of the groove 2232 has two clamping surfaces 2233 opposite to each other. The clamping surface 2233 is parallel to the axial direction O, and is provided with a mounting opening 2234 and a guide groove 2235.

The guide groove 2235 is located between the first surface 2230 and the mounting opening 2234. When the mounting portion 113 of the valve rod 11 is inserted into the groove 2232 along the axial direction O, the pin 141 abuts against the guide groove 2235, and the pin 141 moves along the guide groove 2235, so that the guide groove 2235 guides the pin 141 into the mounting opening 2234.

The guide groove 2235 is separated from the mounting opening 2234. When the pin 141 moves to the end of the guide groove 2235 near the mounting opening 2234, the pin 141 may be retracted into an opening of the bushing 140, so that the pin 141 abuts against the clamping surface 2233 and slides into the mounting opening 2234 along the clamping surface 2233.

The depth of the guide groove 2235 is gradually reduced along the axial direction S from the first surface 2230 toward the mounting opening 2234, so that a smooth transition can be achieved for the pin 141 from abutting against the guide groove 2235 to abutting against the clamping surface 2233.

The second surface 2231 is provided with a pressing groove 2236. The pressing groove 2236 is located between the second surface 2231 and the groove 2232. The pressing groove 2236 is generally a flat square groove. a bottom of the pressing groove 2236 is provided with two slots 2237, the two slots 2237 being located at two sides of the groove 2232, respectively, and each of the slots 2237 being in communication with a corresponding one of the mounting openings 2234.

It may be understood that the number of the mounting openings 2234 corresponds to the number of the locking holes 2242, and the guide groove 2235 is provided on the clamping surface 2233 provided with the mounting opening 2234. In addition, there is not only two guide grooves 2235, as long as there is at least one, that is, at least one of the clamping surfaces 2233 provided with the locking holes 2242 is provided with a guide groove 2235.

The locking structure 224 is U-shaped as a whole, and may be made of a metal material, for example, a stainless steel piece is manufactured by a hemming process. The locking structure 224 includes two locking pieces 2240 and a connecting piece 2241 connected between two of the locking pieces 2240.

Each of the locking pieces 2240 is located in a corresponding slot 2237, an edge of the locking piece 2240 being provided with ratchets, and the edge of the locking piece 2240 being embedded into the groove wall of the slot 2237. The locking piece 2240 is provided with a locking hole 2242 and is opposite to the mounting opening 2234, the locking hole 2242 being exposed to the mounting opening 2234, and the locking piece 2240 being flush with the clamping surface 2233. When sliding into the mounting opening 2234, the pin 141 abuts against the locking piece 2240 and moves to the locking hole 2242 along the locking piece 2240. The pin 141 is inserted into the locking hole 2242 and abuts against the locking hole 2242, so that the mounting portion 113 of the valve rod 11 cannot be pulled out from the groove 2232 along the axial direction O.

It may be understood that, in a first aspect, according to the actual situation, the locking structure 224, the mounting opening 2234, the pressing groove 2236, and the slot 2237 all may be omitted, and the locking hole 2242 is directly provided on the clamping surface 2233. In a second aspect, there are not only two locking holes 2242, and at least one of the two clamping surfaces 2233 is provided with the locking holes 2242. Accordingly, the elastic telescopic structure 14 may be elastically extended and retracted at one side of the mounting portion 113, so that the valve assembly 10 and the sensor assembly 20 can still be assembled. In a third aspect, the elastic telescopic structure 14 extends and retracts in the radial direction, the clamping surface 2233 is disposed parallel to the axial direction. The axial direction O and the radial direction S are merely the optimal fixing methods. Definitely, an included angle between the direction in which the elastic telescopic structure 14 extends and retracts and the clamping surface 2233 may be between 0 degree and 90 degrees.

The locking pieces 2240 are provided with a limiting portion 2243, the limiting portion 2243 being disposed on a side that is of the locking piece 2240 and that faces away from the groove 2232.

The connecting piece 2241 is disposed to fit the bottom of the slot 2236.

The pressing member 221 is U-shaped as a whole, and may be made of a metal material, for example, which is made by folding a stainless steel piece. The pressing member 221 includes two moving plates 2210 and a pressing plate 2211 connected between two moving plates 2210. The two locking pieces 2240 are located between the two moving plates 2210, and each of the moving plates 2210 abuts against a corresponding locking piece 2240. Therefore, the moving plate 2210 may move along the locking piece 2240, so that the end of the moving plate 2210 away from the pressing plate 2211 may extrude the pin 141 from the locking hole 2242, and the mounting portion 113 of the valve rod 11 may be taken out of the groove 2232 along the axial direction O.

A bent plate 2212 is provided between the moving plate 2210 and the pressing plate 2211, one end of the bent plate 2212 being connected to the moving plate 2210, and the other end of the bent plate 2212 being connected to the pressing plate 2211, and the bent plate 2212 being bent in a U shape, so that two ends of the bent plate 2212 are opposite to each other, and the two ends of the bent plate 2212 are located at two sides of the limiting portion 2243. When the moving plate 2210 moves along the locking piece 2240, the limiting portion 2243 may abut against the two ends of the bent plate 2212, respectively, so that the locking structure 224 and the pressing member 221 are not relatively separated.

One end of the moving plate 2210 away from the pressing plate 2211 is inclined toward a direction away from the locking piece 2240, which is convenient for the end of the moving plate 2210 away from the pressing plate 2211 to extrude the pin 141 from the locking hole 2242.

The pressing plate 2211 is opposite to the connecting piece 2241. When the moving plate 2210 moves along the locking piece 2240, and one end of the moving plate 2210 away from the pressing plate 2211 extrudes the pin 141 from the locking hole 2242, the pressing plate 2211 is close to the connecting piece 2241. The pin 141 may be extruded from the locking hole 2242 by pressing the pressing plate 2211.

The second elastic member 222 is configured to provide a second elastic force for moving the pressing plate 2211 in a direction away from the connecting piece 2241. One end of the second elastic member 222 abuts against the pressing plate 2211, and the other end of the second elastic member 222 passes through the connecting piece 2241 and is embedded into the groove bottom of the pressing groove 2236. The second elastic member 222 is a second compression spring. According to the actual situation, the second elastic member 222 may also be replaced with an elastic piece, an elastic rubber ball, and the like.

The pressing member 221 and the second elastic member 222 are disposed, so that the valve assembly 10 and the sensor assembly 20 may be easily disassembled, that is, the pressing plate 2211 of the pressing member 221 is pressed, so that the moving plate 2211 of the pressing member 221 may extrude the pin 141 inserted into the locking hole 2242, to dismantle the valve assembly 10 and the sensor assembly 20.

The valve rod 11 is assembled to the sensor assembly 20, specifically including the following steps.

The mounting portion 113 of the valve rod 11 is inserted into the groove 2232 along the axial direction O, so that the pin 141 is opposite to the locking hole 2242, and the pin 141 is inserted into the locking hole 2242, that is, the assembly of the valve rod 11 and the sensor assembly 20 is completed. The pin 141 may abut against the guide groove 2235. On the one hand, the guide groove 2235 guides the pin 141 to be opposite to the locking hole 2242. On the other hand, since the valve rod 11 is inserted in a direction along the axial direction O, in a direction from the first surface 2230 to the locking hole 2242, the depth of the guide groove 2235 is gradually reduced, so that the pin 141 may be easily retracted into the bushing 140 in the radial direction O.

The valve rod 11 is disassembled from the sensor assembly 20, specifically including the following steps.

The pressing plate 2111 of the pressing member 211 is pressed, and the moving plate 2110 of the pressing member 211 moves relative to the locking piece 2240, so that the moving plate 2110 extrudes the pin 141 inserted into the locking hole 2242 from the locking hole 2242. In this case, the valve rod 11 may be pulled out from the groove 2235 along the axial direction O, and the valve rod 11 is removed from the sensor assembly 20.

The tire pressure sensor 100 is assembled to a rim of a tire, specifically including the following.

A case bottom 210 of the sensor assembly 20 is caused to fit the rim, and the rim is provided with a reserved hole for the valve rod 11 to extend.

Figure 11:
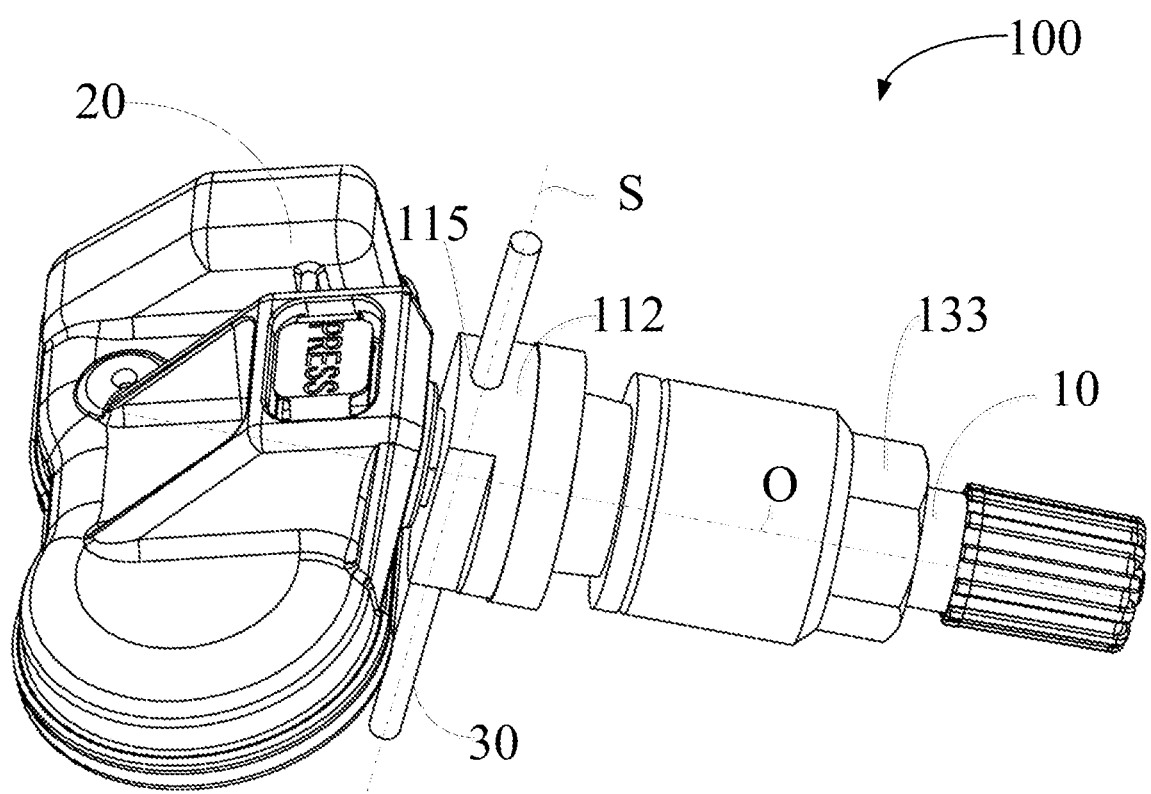
FIG. 11 is another three-dimensional diagram of the sensor assembly shown in FIG. 1, which includes a metal rod member.

In one aspect, when one of the at least two sets of valve assemblies 10 with different specifications is assembled, the seal ring 130 is sleeved on the rod portion 111 of the valve rod 11, and the seal ring 130 abuts against the vent portion 112 of the valve rod 11. The mouth portion 110 of the valve rod 11 passes through the reserved hole of the rim, and then the gasket 131 and the nut 133 are sleeved on the rod portion 111 of the valve rod 11 in sequence, so that the gasket 131 and the seal ring 130 clamp the rim. The nut 133 is connected to the rod portion 111 of the valve rod 11 through threads, so that the gasket 131 is clamped between the rim and the nut 133. In some embodiments provided in the present invention, as shown in FIG. 11, the tire pressure sensor 100 further includes a metal rod member 30 for inserting the second vent hole 115. During the process of disassembling the nut 133 from the valve rod 11, since the elastic telescopic structure 14 is used as a connection structure between the valve rod 11 and the sensor assembly 20, during screwing of the nut 133, an applied torque about the axial direction O may act on the elastic telescopic structure 14, which may easily cause damage to the elastic telescopic structure 14. Therefore, the metal rod member 30 is inserted into the second vent hole 115 in the radial direction S, and during the screwing of the nut 133, the metal rod member 30 is fixed through hand holding, or the like, so that the metal rod member 30 may replace the elastic telescopic structure 14 to bear the torque applied when the nut 133 is screwed, and the elastic telescopic structure 14 is not easily damaged.

On the other hand, when the other one of the at least two sets of valve assemblies 10 with different specifications is assembled, the rod sleeve 13 is directly sleeved on the rod portion 111 of the valve rod 11, and then the mouth portion 110 of the valve rod 11 passes through the rim.

Finally, the valve cover 12 is connected to the mouth portion 110 of the valve rod 11 through threads.

The tire pressure sensor 100 is specifically used as below.

A tire may be pumped up through a first air hole 116.

A circuit board 23 in the sensor assembly 20 detects the air pressure in the tire, and communicates with the tire pressure monitoring terminal through the antenna 25 in the sensor assembly 20.

In comparison to the prior art, in the tire pressure sensor 100 provided in the present invention, after the elastic telescopic structure 14 is shortened, the mounting portion 113 of the valve assembly 10 may be inserted between the two clamping surfaces 2233. When the mounting portion 113 of the valve assembly 10 is located between the two clamping surfaces 2233, the elastic telescopic structure 14 may be automatically extended and inserted into the locking hole 2242, so that the valve assembly 10 and the sensor assembly 20 may be relatively easy to install without requiring additional tools.

It should be finally noted that the above embodiments are merely intended for describing the technical solutions of the present invention rather than limiting the present invention.

Based on the idea of the present invention, the technical features in the foregoing embodiments or different embodiments may be combined, the steps may be implemented in any order, and many other changes in the different aspects of the present invention as described above may exist. For brevity, such changes are not provided in the detailed descriptions. Although the present invention is described in detail with reference to the foregoing embodiments, those of ordinary skill in the art should understand that they can still make modifications to the technical solutions described in the foregoing embodiments or make equivalent substitutions to some technical features thereof, without departing from scope of the technical solutions of the embodiments of the present invention.

What is claimed is:

1. A tire pressure sensor (100), comprising:
   a valve assembly (10) comprising a mounting portion (113), a rod portion (111), a rod sleeve (13) and an elastic telescopic structure (14), the mounting portion (113) and the rod portion (111) being connected, the rod sleeve (13) being sleeved on the rod portion (111), the elastic telescopic structure (14) being mounted to the mounting portion (113), and the elastic telescopic structure (14) elastically extending and retracting on at least one side of the mounting portion (113);
   a sensor assembly (20) having two opposite clamping surfaces (2233), at least one of the two clamping surfaces (2233) being provided with a locking hole (2242), the mounting portion (113) being located between the two clamping surfaces (2233), and the elastic telescopic structure (14) being inserted into the locking hole (2242), wherein
   there are at least two sets of the valve assemblies (10), any of the at least two sets of the valve assemblies (10) being alternatively connected to the sensor assembly (20), a rod sleeve (13) of one of the at least two sets of the valve assemblies (10) being made of a metal material, and a rod sleeve (13) of the other of the at least two sets of the valve assemblies (10) being made of a rubber material.

2. The tire pressure sensor (100) according to claim 1, wherein the mounting portion (113) is in contact with the two clamping surfaces (2233), respectively.

3. The tire pressure sensor (100) according to claim 1, wherein the valve assembly (10) comprises a valve rod (11), the valve rod (11) comprising the mounting portion (113) and the rod portion (111); and
   the elastic telescopic structure (14) may extend and retract along a radial direction (S) of the valve rod (11), and the clamping surface (2233) is parallel to an axial direction (0) of the valve rod (11).

4. The tire pressure sensor (100) according to claim 3, wherein the sensor assembly (20) has a first surface (2230), the first surface (2230) being provided with a groove (2232), the groove (2232) having the two clamping surfaces (2233), and
   the mounting portion (113) is inserted into the groove (2232).

5. The tire pressure sensor (100) according to claim 4, wherein at least one of the clamping surfaces (2233) provided with the locking hole (2242) is provided with a guide groove (2235), the guide groove (2235) being disposed between the locking hole (2242) and the first surface (2230) along the axial direction (S).

6. The tire pressure sensor (100) according to claim 5, wherein in a direction along the axial direction (S) and toward the locking hole (2242) from the first surface (2230), a depth of the guide groove (2235) gradually decreases.

7. The tire pressure sensor (100) according to claim 4, wherein the mounting portion (113) is provided with a mounting hole (117) provided along the radial direction (S);
   the elastic telescopic structure (14) being mounted to the mounting hole (117).

8. The tire pressure sensor (100) according to claim 7, wherein the elastic telescopic structure (14) comprises a pin (141) and a first elastic member (142);
   the pin (141) being sleeved in the mounting hole (117), and the pin (141) retracting into or extending out of the mounting hole (117) along the radial direction (S); and
   the first elastic member (142) being configured to provide a first elastic force for causing the pin (141) to extend out of the mounting hole (117).

9. The tire pressure sensor (100) according to claim 8, wherein the two clamping surfaces (2233) are both provided with the locking hole (2242), the mounting holes (117) are provided with two openings on the mounting portion (113), and there are two pins (141);
   each of the pins (141) extending out of or retracting into the mounting hole (117) from a corresponding opening of the mounting hole (117) along the radial direction (S).

10. The tire pressure sensor (100) according to claim 9, wherein the first elastic member (142) abuts between the two pins (141).

11. The tire pressure sensor (100) according to claim 8, wherein the first elastic member (142) is a first compression spring.

12. The tire pressure sensor (100) according to claim 8, wherein the elastic telescopic structure (14) further comprises a bushing (140) mounted to the mounting hole (117);
    the bushing (140) having an inner cavity (1400) disposed along the radial direction (S), and the pin (140) being sleeved in the inner cavity (1400).

13. The tire pressure sensor (100) according to claim 4, wherein the valve rod (11) further comprises a vent portion (112) and a mouth portion (110), the mounting portion (113), the vent portion (112), the rod portion (111) and the mouth portion (110) being arranged along the axis (O) in sequence; and
    the valve rod (11) is provided with a first vent hole (114) and a second vent hole (115) which are in communication with each other, an opening of the first vent hole (114) being provided at the mouth portion (110), and an opening of the second vent hole (115) being provided at the vent portion (112);
    the second vent hole (112) being located outside the groove (2232).

14. The tire pressure sensor (100) according to claim 13, wherein the second vent hole (115) is disposed along the radial direction (S).

15. The tire pressure sensor (100) according to claim 13, wherein the valve assembly (10) further comprises a valve cover (12);
    the valve cover (12) being connected to the mouth portion (110) through threads.

16. The tire pressure sensor (100) according to claim 1, wherein the rod sleeve (13) made of metal comprises a seal ring (130), a gasket (131) and a nut (132);
    the seal ring (130), the gasket (131) and the nut (132) being sleeved on the rod portion (111) in sequence, the nut (130) and the rod portion (111) being connected through threads, the gasket (131) being clamped between the nut (132) and the seal ring (130), and the seal ring (130) being clamped between the vent portion (112) and the gasket (131).

17. The tire pressure sensor (100) according to claim 16, wherein the tire pressure sensor (100) further comprises a metal rod member (30), the metal rod member (30) being configured to pass through the second vent hole (115).

18. The tire pressure sensor (100) according to claim 4, wherein the sensor assembly (20) comprises a base (21) and a bracket (220) connected to the base (21);
   the base (21) being configured to fit a rim, and a transmitting plate being provided in the base (21); and
   the bracket (220) having the first surface (2230).

19. The tire pressure sensor (100) according to claim 18, wherein the base (21) comprises an upper case (211) and a case bottom (210);
   the upper case (211) being connected to the bracket (220), and the case bottom (210) being configured to fit the rim; and
   the upper case (211) and the case bottom (210) being connected through laser welding, and the upper case (211) and the case bottom (210) being connected to form a cavity for receiving the transmitting plate.

20. The tire pressure sensor (100) according to claim 18, wherein the bracket (220) comprises a bracket body (223) and a locking structure (224) connected to the bracket body (223);
   the bracket body (223) being connected to the base (21) and having the first surface (2230);
   both the clamping surfaces (2233) being provided with mounting openings (2234); and
   the locking structure (224) comprising locking pieces (2240), two of the locking pieces (2240) being provided with the locking holes (2242), each of the locking pieces (2240) being opposite to a corresponding one of the mounting openings (2234), and each of the locking holes (2242) being exposed to a corresponding one of the mounting openings (2234).

* * * * *